US012493292B2

(12) United States Patent
Sohlberg et al.

(10) Patent No.: US 12,493,292 B2
(45) Date of Patent: Dec. 9, 2025

(54) NETWORK SYSTEM, A USER DEVICE AND METHODS THEREIN FOR ENABLING MANAGEMENT OF A MASS EXCAVATION PROJECT

(71) Applicant: VOLVO TRUCK CORPORATION, Gothenburg (SE)

(72) Inventors: Per Sohlberg, Hovås (SE); Lars-Ola Sjöström, Västerås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 94 days.

(21) Appl. No.: 18/490,890

(22) Filed: Oct. 20, 2023

(65) Prior Publication Data

US 2024/0142981 A1 May 2, 2024

(30) Foreign Application Priority Data

Oct. 28, 2022 (EP) .................................. 22204473

(51) Int. Cl.
*G05D 1/02* (2020.01)
*G05D 1/00* (2006.01)
*G06Q 50/08* (2012.01)
*G06Q 10/0631* (2023.01)

(52) U.S. Cl.
CPC .......... *G05D 1/0214* (2013.01); *G06Q 50/08* (2013.01); *G06Q 10/0631* (2013.01)

(58) Field of Classification Search
CPC ... G05D 1/0214; G06Q 50/08; G06Q 10/0631
See application file for complete search history.

(56) References Cited

U.S. PATENT DOCUMENTS

| 5,815,826 A | 9/1998 | Henderson et al. |
| 9,575,491 B1 | 2/2017 | Nelson et al. |
| 11,236,492 B1 | 2/2022 | Ready-Campbell et al. |

(Continued)

FOREIGN PATENT DOCUMENTS

| CA | 2959394 A1 | 9/2018 |
| CN | 112381255 A | 2/2021 |

(Continued)

OTHER PUBLICATIONS

Extended European Search Report in corresponding European Patent Application No. 22204473.7 dated Feb. 27, 2023 (7 pages).

*Primary Examiner* — Rodney A Butler
(74) *Attorney, Agent, or Firm* — Jeffri A. Kaminski; Venable LLP

(57) ABSTRACT

A network system and method therein for enabling management of a mass excavation project is described. The method comprise obtaining a first information indicating that the transporting asset has been loaded with excavated material; providing a load receipt based on the obtained first information, whereby the load receipt is associated with a load destination site for depositing the excavated material; obtaining a second information indicating that the transporting asset has off-loaded the excavated material at the load destination site and the weight of the excavated material; and determining a remaining material weight receiving capacity of the load destination site based on the obtained weight of the excavated material and the maximum material weight receiving capacity of the load destination site.

12 Claims, 3 Drawing Sheets

(56) References Cited

U.S. PATENT DOCUMENTS

| | | |
|---|---|---|
| 2009/0076674 A1 | 3/2009 | Kiegerl et al. |
| 2012/0136523 A1 | 5/2012 | Everett et al. |
| 2015/0134184 A1 | 5/2015 | Takeda |
| 2015/0178859 A1 | 6/2015 | Takeda |
| 2015/0233716 A1 | 8/2015 | Sugihara et al. |
| 2016/0231750 A1 | 8/2016 | Kawamata et al. |
| 2017/0169626 A1* | 6/2017 | Thomsen ................. G07C 5/02 |
| 2017/0314232 A1 | 11/2017 | Chi et al. |
| 2017/0344011 A1 | 11/2017 | Stratton |
| 2018/0088591 A1 | 3/2018 | Friend |
| 2018/0210454 A1 | 7/2018 | Ready-Campbell et al. |
| 2018/0341268 A1 | 11/2018 | Taylor et al. |
| 2019/0040607 A1 | 2/2019 | Wei |
| 2019/0370725 A1 | 12/2019 | Ha et al. |
| 2020/0032490 A1 | 1/2020 | Ready-Campbell et al. |
| 2020/0041329 A1 | 2/2020 | Shike |
| 2020/0326713 A1 | 10/2020 | Spielman et al. |
| 2020/0401141 A1 | 12/2020 | Vitale et al. |
| 2021/0097462 A1 | 4/2021 | Brickner et al. |
| 2021/0131064 A1 | 5/2021 | Subramanian |
| 2021/0148086 A1 | 5/2021 | Ready-Campbell et al. |
| 2021/0279684 A1 | 9/2021 | Hanauer et al. |
| 2021/0295226 A1 | 9/2021 | Walker et al. |

FOREIGN PATENT DOCUMENTS

| | | |
|---|---|---|
| DE | 102020206370 A1 | 11/2021 |
| KR | 101669756 B1 | 10/2016 |

\* cited by examiner

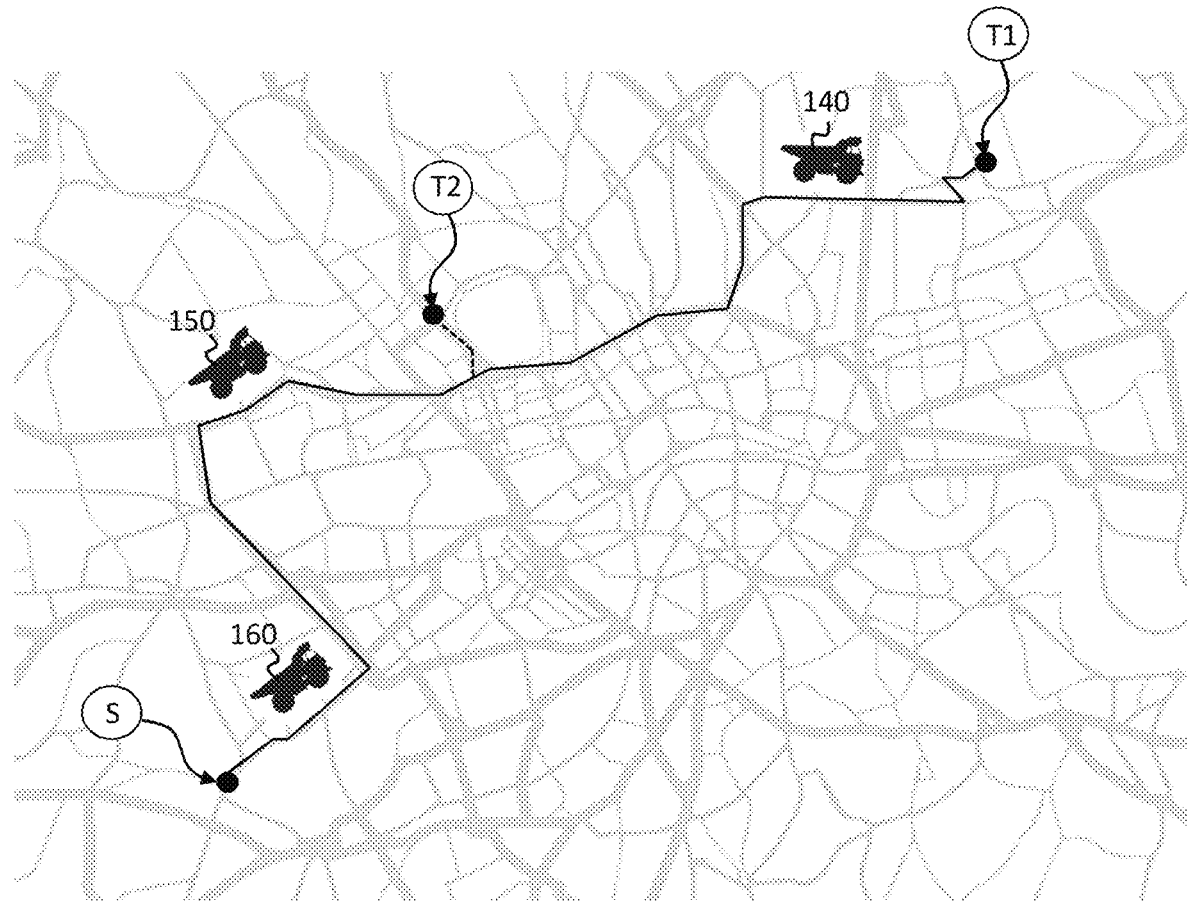
FIG. 2
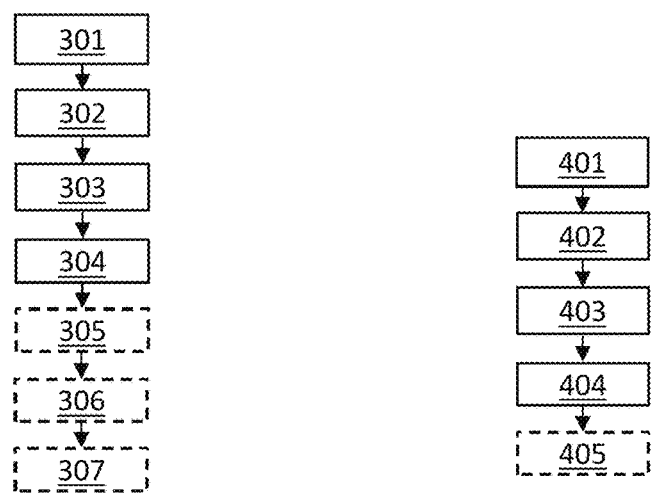
FIG. 3
FIG. 4

NETWORK SYSTEM, A USER DEVICE AND METHODS THEREIN FOR ENABLING MANAGEMENT OF A MASS EXCAVATION PROJECT

TECHNICAL FIELD

The disclosure relates generally to a mass excavation projects. In particular aspects, the disclosure relates to a network system and method therein for enabling management of a mass excavation project, as well as, a user device and method therein associated with a transporting asset for enabling management of a mass excavation project.

BACKGROUND

In a mass excavation project, a large amount of excavated material or mass is normally loaded onto transporting assets, e.g. trucks or haulers, and loaded out from the site of a mass excavation. The load-out material is then typically transported by the transporting assets towards one or more destination sites, such as, for example, landfills, dump sites or specific depots. Landfills or dump sites are normally for storage, e.g. to fill out land, while specific depots may be used for necessary further processing of the load-out material. For example, load-out material that may comprise hazardous and/or contaminated material may need to be transported to such specific depots to be processed in a specific manner; this, in order to ensure compliance with certain laws, regulations or environmental requirements when handling these type of materials.

Today, however, when managing mass excavation projects, the transporting assets may be directed to the same or different destination sites without coordination. This may results in increased environmental impacts and higher cost in handling the load-out material for a mass excavation project.

SUMMARY

According to a first aspect of the examples herein, a method performed by a network system for enabling management of a mass excavation project, wherein the mass excavation project is associated with one or more transporting assets and one or more load destination sites is described. Each destination site is associated with a maximum material weight receiving capacity. The method comprise obtaining, from a user device associated with a transporting asset, a first information indicating that the transporting asset has been loaded with excavated material. Also, the method comprise providing, to the user device associated with the transporting asset, a load receipt based on the obtained first information, whereby the load receipt is associated with a load destination site for depositing the excavated material. Furthermore, the method comprise obtaining, from the user device associated with the transporting asset, a second information indicating that the transporting asset has off-loaded the excavated material at the load destination site and the weight of the excavated material. The method also comprise determining a remaining material weight receiving capacity of the load destination site based on the obtained weight of the excavated material and the maximum material weight receiving capacity of the load destination site.

The first aspect of the disclosure may seek to enable an improved management of a mass excavation project. A technical benefit may include improved utilization of transporting assets associated with a mass excavation project. This may further lead to reduced environmental impact and/or lower cost associated with the mass excavation project.

In some examples, the method may further comprise providing, to user devices associated with the one or more transporting assets and/or user devices associated with the mass excavation project, information indicating the determined remaining material weight receiving capacity of the load destination site. A technical benefit may include that a driver of a transporting asset carrying a load out associated with the mass excavation project may be given an indication of which destination site is most advantageous to deposit the excavated material. Additionally, foremen, truck dispatchers, site managers, machine operators using other user devices may also be provided with this information.

In some examples, the method may further comprise disabling associations of load receipts to a load destination site when the remaining material weight receiving capacity of the load destination site falls below a predetermined threshold level. A technical benefit may include that a load destination site that may be closed, is about to close or have already exceeded its maximum capacity for the current work shift may be made unavailable for association with a load receipt. This means that a transporting assets may no longer be directed towards this particular destination site.

In some examples, the method may further comprise providing, to the user device associated with the transporting asset, a delivery receipt based on the obtained second information. A technical benefit may include that a destination site that the driver of the transporting asset is notified of the fact that the load has been centrally registered.

In some examples, the obtained weight of the excavated material is a crowned or verified weight obtained at the load destination site by the user device associated with the transporting asset. A technical benefit may include that using a crowned or verified weight may be that more accurate weight levels may be achieved, thus increasing the accuracy of the determined remaining material weight receiving capacity of a load destination site.

According to a second aspect of the examples herein, a network system for enabling management of a mass excavation project, wherein the mass excavation project is associated with one or more transporting assets and one or more load destination sites is described. Each destination site is associated with a maximum material weight receiving capacity. The network system comprises a processing circuitry and a memory. The processing circuitry is configured to obtain, from a user device associated with a transporting asset, a first information indicating that the transporting asset has been loaded with excavated material, provide, to the user device associated with the transporting asset, a load receipt based on the obtained first information, whereby the load receipt is associated with a load destination site for depositing the excavated material, obtain, from the user device associated with the transporting asset, a second information indicating that the transporting asset has off-loaded the excavated material at the load destination site and the weight of the excavated material, and determine a remaining material weight receiving capacity of the load destination site based on the obtained weight of the excavated material and the maximum material weight receiving capacity of the load destination site.

In some examples, the processing circuitry may further be configured to provide, to user devices associated with the one or more transporting assets, information indicating the determined remaining material weight receiving capacity of the load destination site. In some examples, the processing circuitry may further be configured to disable associations of load receipts to a load destination site when the remaining material weight receiving capacity of the load destination site falls below a predetermined threshold level. In some examples, the processing circuitry may further be configured to provide, to the user device associated with the transporting asset, a delivery receipt based on the obtained second information. Effects and advantages of this second aspect is to a large extent analogous to those described above in connection with the first aspect.

According to a third aspect of the examples herein, a method performed by a user device associated with a transporting asset for enabling management of a mass excavation project is described. The method comprise providing, to a network system, a first information indicating that the transporting asset has been loaded with excavated material. The method also comprise obtaining, from the network system, a load receipt based on the provided first information, whereby the load receipt is associated with a load destination site for depositing the excavated material. The method further comprise receiving, at the load destination site associated with the load receipt, information indicating the weight of the excavated material. Furthermore, the method comprise providing, to a network system, a second information indicating that the transporting asset has off-loaded the excavated material at the load destination site and the received weight of the excavated material. Effects and advantages of this third aspect is to a large extent analogous to those described above in connection with the first aspect.

In some examples, the method may further comprise triggering an alert in the user device when the remaining material weight receiving capacity of a load destination site associated with an obtained the load receipt falls below a preconfigured threshold level. A technical benefit may include that a driver of a transporting asset carrying a load out associated with the mass excavation project may be given an indication that the destination site towards which it is heading may be closed, is about to close or have already exceeded its maximum capacity for the current work shift and therefore in unavailable. This means that the destination site may not be available for the transporting asset to make its deposit and that the transporting asset should proceed to another destination site for depositing its loaded excavated material.

According to a fourth aspect of the examples herein, a user device associated with a transporting asset for enabling management of a mass excavation project is described. The user device comprise a processing circuitry and a memory. The processing circuitry is configured to provide, to a network system, a first information indicating that the transporting asset has been loaded with excavated material, obtain, from the network system, a load receipt based on the provided first information, whereby the load receipt is associated with a load destination site for depositing the excavated material, receiving, at the load destination site associated with the load receipt, information indicating the weight of the excavated material, provide, to a network system, a second information indicating that the transporting asset has off-loaded the excavated material at the load destination site and the received weight of the excavated material.

In some examples, the processing circuitry may further be configured to trigger an alert in the user device when the remaining material weight receiving capacity of a load destination site associated with an obtained the load receipt falls below a preconfigured threshold level. Effects and advantages of this fourth aspect is to a large extent analogous to those described above in connection with the third aspect.

According to a fifth aspect of the examples herein, a vehicle comprising a user device as described above. According to a sixth aspect of the examples herein, a computer program product comprising program code means for performing the steps of the methods described above when said program is run on a processing circuitry of a network system or a processing circuitry of a user device, respectively, is described. According to a seventh aspect of the examples herein, a non-transitory computer-readable storage medium comprising instructions, which when executed on a processing circuitry of a network system or on a processing circuitry of a user device, cause the processing circuitry to perform the methods described above is described. Effects and advantages of these fifth, sixth and seventh aspects are to a large extent analogous to those described above in connection with the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 2 is a schematic illustration of possible routes of a transporting asset to different destination sites, FIG. 3 is a flowchart depicting examples of a method for managing a mass excavation project in a network system, FIG. 4 is a flowchart depicting examples of a method in a user device.

DETAILED DESCRIPTION

Aspects set forth below represent the necessary information to enable those skilled in the art to practice the disclosure.

Figure 1:
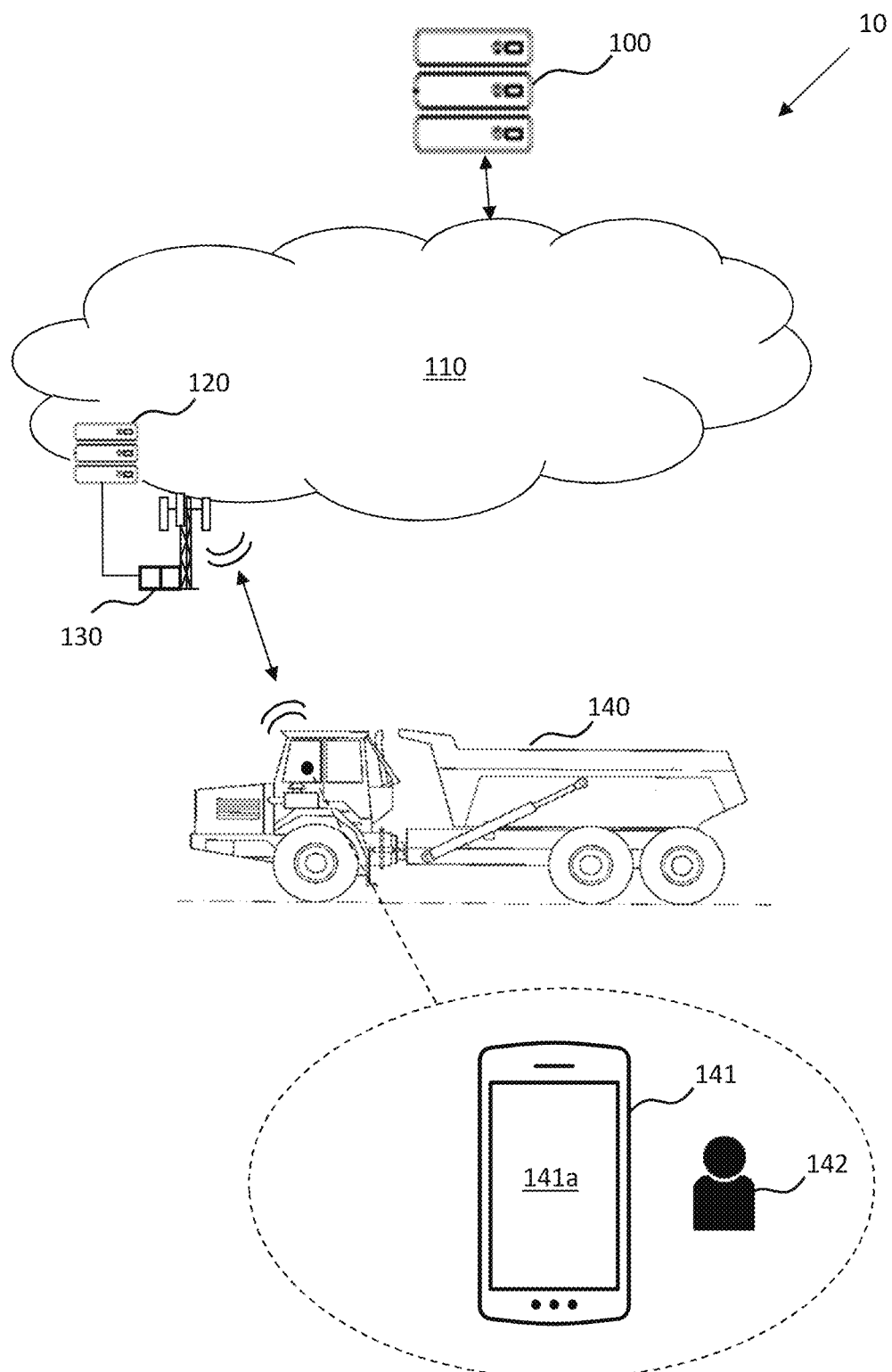
FIG. 1 is a schematic illustration of a network system and a user device for enabling management of a mass excavation project according to some examples.

FIG. 1 illustrates an example of a network system 100 and a user device 141 for enabling management of a mass excavation project according to examples described herein. Here, it should be noted that the network system 100 may be implemented by one or more centrally located and/or distributed network units, such as, e.g. online data processing server(s), configured to manage mass excavation projects. The network system 100 and the one or more centrally located and/or distributed network units may also form part of a cloud service configured to manage mass excavation projects. The network system 100 may be connected to and configured to wirelessly communicate with the user device 141 via a wireless communications network 110, wherein the wireless communications network 110 may comprise one or more radio base stations or access points 120, 130 for enabling a wireless communication between the network system 100 and the user device 141. The user device 141 may be operated by a driver 142 of a transporting asset 140 via a user interface 141a. The user device 141 may, for example, be a wireless device, such as, a mobile, cellular or smart phone or tablet, being capable of wireless communications with the network system 100 via the wireless communications network 110. Optionally, the user device 131 may be embedded in on-board communication system of the transporting asset 140, thereby being capable of wireless communications with the network system 100 via the wireless communications network 110. The transporting asset 140 may be any form of vehicle arranged to carry and transport excavated material from a site of a mass excavation project to a destination site, such as, e.g. a truck, a hauler or a load carrier.

FIG. 2 shows possible routes of different transporting assets 140, 150, 160 from a site S of a mass excavation project to destination sites $T_1$, $T_2$. Although only three transporting assets and two destination sites are shown associated with the mass excavation project in FIG. 2 for the sake of simplicity, it should be noted that a mass excavation project may be associated with any number or plurality of different transporting assets and/or any number or plurality of different destination sites.

As part of developing the examples described herein, it has been realized that as an excavator or loader at a site S of a mass excavation project has finished loading excavated material onto a transporting asset, e.g. transporting asset 140, a digital load receipt for the transporting asset 140 is normally generated by the network system 100 and sent out to the user device 141. This may, for example, be performed in response to receiving information from the user device 141, or e.g. from a load check-out system implemented at the site S of the mass excavation project, indicating that the transporting asset 140 has been loaded with excavated material and is about to transport the excavated material away from the site S of the mass excavation project. Upon generating the digital load receipt, the network system 100 may connect each digital load receipt with one of the available destination sites $T_1$, $T_2$, which designates and directs the driver 142 of the transporting assets to one of the available destination sites $T_1$, $T_2$. However, this is conventionally performed by the network system 100 without any awareness or consideration of the current capabilities of the destination sites $T_1$, $T_2$.

Here, each of the available different sites $T_1$, $T_2$ may be associated with a maximum material weight receiving capacity. This means, for example, that each of the landfills, dump sites or specific depots may have specific limits for how much material or mass they are able to receive and/or process during a normal work shift. This may cause problems when, for example, a mass excavation project loads out a large amount of materials from a mass excavation site S onto several different transporting assets 140, 150, 160 and sends them to a destination site $T_1$, $T_2$ that is closed or cant receive any more material for further processing (e.g. the destination site has reached its maximum receiving capacity for the current work shift). This means that the transporting assets 140, 150, 160 may have to be re-routed to other one of the available different sites $T_1$, $T_2$ to be off-loaded, which will lead to a higher environmental impact for the transportation and likely also higher costs. There is also an additional risk that the transporting assets 140, 150, 160 will not be able to be unloaded until the next day if no other suitable destination sites may be found. In this case, for example, if one or more of the transporting assets 140, 150, 160 are loaded with wet clay and re-routed late in the afternoon to other destination sites, but are not able to be unloaded until the next day and this occurs during a winter's day, then the wet clay loaded onto the one or more transporting assets 140, 150, 160 may become solid rock. This will require additional efforts and incur further costs the following day for removing it from the one or more transporting assets 140, 150, 160 and lead to lost load-out capacity the next day for the site S of the mass excavation project. Alternatively, it may also result in that operators within the mass excavation project may avoid loading out transporting assets 140, 150, 160 at the end of a work shift, which then would lead to a reduced utilization of available transporting assets 140, 150, 160 and lower the efficiency of the mass excavation project. Hence, there is a need for improved management of mass excavation projects.

Examples of a method performed by a network system 100 for enabling management of a mass excavation project, wherein the mass excavation project is associated with one or more transporting assets 140, 150, 160 and one or more load destination sites $T_1$, $T_2$, will now be described with reference to the flowchart depicted in FIG. 3. FIG. 3 is an illustrated example of actions, steps or operations which may be performed by the network system 100 described above with reference to FIG. 1. Here, each load destination site $T_1$, $T_2$ is associated with a maximum material weight receiving capacity. The method may comprise the following actions, steps or operations.

Action 301. Initially, the network system 100 obtains, from a user device 141 associated with a transporting asset 140, a first information indicating that the transporting asset 140 has been loaded with excavated material. This means, for example, that the network system 100 may be notified by the driver 142 of the transporting asset 140 that the transporting asset 140 has been loaded with excavated material at the site S of the mass excavation project and intends to transport the excavated material away from the site S of the mass excavation project.

Action 302. After obtaining the first information in Action 301, the network system 100 provides, to the user device 141 associated with the transporting asset 140, a load receipt based on the obtained first information, whereby the load receipt is associated with a load destination site $T_1$ for depositing the excavated material. This means, for example, that the network system 100 may notify or confirm to the user device 141 of the transporting asset 140 that it has registered that the transporting asset 140 has been loaded with excavated material at the site S of the mass excavation project. Here, the network system 100 also dispatches, i.e. designates, and directs the driver 142 of the transporting asset 140 to one of the available destination sites $T_1$, $T_2$ for depositing the excavated material. In other words, the network system 100 may select and associate the load receipt for the transporting asset 140 with a specific one of the available destination sites $T_1$, $T_2$ for depositing the excavated material.

Action 303. Subsequently, the network system 100 obtains, from the user device 141 associated with the transporting asset 140, a second information indicating that the transporting asset 140 has off-loaded the excavated material at the load destination site $T_1$ and the weight of the excavated material. This means, for example, that the network system 100 is not only notified about the time when the transporting asset 140 off-loaded the excavated material at the load destination site $T_1$, but also about the actual weight of the excavated material that was loaded onto the transporting asset 140 at the site S of the mass excavation project. This enable, for example, the network system 100 to set limitations that defines the total material weight receiving capacity of each of the load destination sites $T_1$, T2 available to the mass excavation project, i.e. how much excavated material may be transported to each load destination sites $T_1$, T2. This may apply to a single work shift or longer suitable defined periods of time for each particular load destination sites $T_1$, T2.

Here, according to some examples, the obtained weight of the excavated material is a crowned or verified weight obtained at the load destination site by the user device associated with the transporting asset. A crowned or verified weight may here mean that a scale or weight measurement apparatus is used at the load destination site that has a certain approved or certified weight accuracy or tolerance level. This means that by using a crowned or verified weight, more accurate weight levels may be achieved. This may increase the accuracy of the continuous determination of the remaining material weight receiving capacity of each of the load destination sites $T_1$, T2 available to the mass excavation project.

Action 304. After obtaining the second set of information in Action 303, the network system 100 determines a remaining material weight receiving capacity of the load destination site $T_1$ based on the obtained weight of the excavated material and the maximum material weight receiving capacity of the load destination site $T_1$. This means, for example, that since the network system 100 may have access to, be configured with or comprise, information regarding the total material weight receiving capacity of each of the load destination sites $T_1$, T2 available to the mass excavation project, the network system 100 may continuously update the remaining material weight receiving capacity of each of the load destination sites $T_1$, T2 available to the mass excavation project. This advantageously allows the network system 110, or user thereof, to apply corrective measures in order to avoid transporting assets 140, 150, 160 carrying excavated material from the site S of the mass excavation project to be dispatched to a load destination sites $T_1$, T2 that is not capable of receiving the load of excavated material or closed. For example, as shown in FIG. 2, instead of the transporting assets 140, 150, 160 carrying excavated material from the site S of the mass excavation project to a load destination site $T_1$ that is closed, e.g. due to receiving its maximum allowed material for the day, the transporting assets 140, 150, 160 may be dispatched to another load destination site, e.g. the load destination site $T_2$. In other words, the network system 100 may select and associate the load receipt for the transporting asset 140 with a specific one of the available destination sites $T_1$, $T_2$ for depositing the excavated material based on the remaining material weight receiving capacity of each of the load destination sites $T_1$, T2 available to the mass excavation project.

Action 305. Optionally, in some examples, the network system 100 may provide, to user devices associated with the one or more transporting assets 140, 150, 160 and/or user devices associated with the mass excavation project, information indicating the determined remaining material weight receiving capacity of the load destination site $T_1$. This means, for example, that the network system 100 may notify the driver 142 of a transporting asset 140 carrying excavated material from the site S of the mass excavation project of which load destination site $T_1$, $T_2$ is most advantageous to deposit the excavated material. Hence, the driver 142 of a transporting asset 140 may alter its route towards another load destination $T_1$, $T_2$ if deemed necessary. According to another example, other personnel associated with the mass excavation project, such as, e.g. foremen, truck dispatchers, site managers, machine operators, etc., may use other user devices when provided with this information, e.g. wireless communication devices or other devices connected to the Internet. Thereby, a more efficient management of the mass excavation project is enabled.

Action 306. According to some examples, the network system 100 may disable associations of load receipts to a load destination site $T_1$ when the remaining material weight receiving capacity of the load destination site $T_1$ falls below a predetermined threshold level. This means, for example, that the network system 100 may prevent a load destination site $T_1$, $T_2$ that may be about to or have already exceeded its maximum capacity for the current work shift to be associated with a load receipt, i.e. no transporting assets 140, 150, 160 will no longer be dispatched to this particular load destination site $T_1$, $T_2$.

Action 307. Additionally, in some examples, after obtaining the second set of information in Action 303, the network system 100 may provide, to the user device 141 associated with the transporting asset 140, a delivery receipt based on the obtained second information. This means, for example, that the network system 100 may notify or confirm to the user device 141 of the transporting asset 140 that it has registered that the transporting asset 140 has off-loaded the excavated material at the site S of the mass excavation project and the actual weight of the excavated material that was loaded onto the transporting asset 140 at the site S of the mass excavation project. Here, it should also be noted that a mass excavation project may include one or several different sites at which material is to be excavated and transported. The network system 100 may be arranged to handle one or more mass excavation projects and digitally associate each load and delivery receipt to a mass excavation project.

Examples of a method performed by a user device 141 associated with a transporting asset 140 for enabling management of a mass excavation project, will now be described with reference to the flowchart depicted in FIG. 4. FIG. 4 is an illustrated example of actions, steps or operations which may be performed by the user device 141 described above with reference to FIG. 1. The method may comprise the following actions, steps or operations.

Action 401. Initially, the user device 141 provides, to a network system 100, a first information indicating that the transporting asset 140 has been loaded with excavated material. This means, for example, that the user device 141 may be used by the driver 142 of the transporting asset 140 to notify the network system 100 that the transporting asset 140 has been loaded with excavated material at the site S of the mass excavation project and intends to transport the excavated material away from the site S of the mass excavation project.

Action 402. In response to providing the first information to the network system 100 in Action 401, the user device 141 obtains from the network system 100 a load receipt based on the provided first information, whereby the load receipt is associated with a load destination site $T_1$ for depositing the excavated material. This means, for example, that the user device 141 may receive a notification or confirmation that the network system 100 has registered that the transporting asset 140 has been loaded with excavated material at the site S of the mass excavation project. Here, the user device 141 also receives information from the network system 100 that directs the driver 142 of the transporting asset 140 to one of the available destination sites $T_1$, $T_2$ for depositing the excavated material. In other words, the user device 141 may receive a load receipt that specifically indicate a specific one of the available destination sites $T_1$, $T_2$ for the transporting asset 140 to deposit the excavated material.

Action 403. Subsequently, the user device 141 receives, at the load destination site $T_1$ associated with the load receipt, information indicating the weight of the excavated material. This means, for example, that the user device 141 may, after receiving its load receipt in Action 402, proceed with the transport of the excavated material towards the load destination site $T_1$ associated with the load receipt. As the transporting asset 140 arrives at the load destination site $T_1$, the transporting asset 140 is normally weighed together with its loaded excavated material in order to determine the weight of the excavated material, i.e. load weight. The result of the weighing may be presented to the driver 142 of the transporting asset 140 which may input the result in the user device 141. This may, for example, be performed by the driver 142 manually inputting the result in the user device 141 or automatically by scanning a barcode or QR-code indicating the result to the user device 141. Here, according to some examples, the obtained weight of the excavated material may be a crowned or verified weight obtained at the load destination site $T_1$ by the user device 141 associated with the transporting asset 100.

Action 404. After receiving the information indicating the weight of the excavated material in Action 403, the user device 141 provides, to the network system 100, a second information indicating that the transporting asset 140 has off-loaded the excavated material at the load destination site $T_1$ and the received weight of the excavated material. This means, for example, that the user device 141 may notify the network system 100 regarding the time when the transporting asset 140 off-loaded the excavated material at the load destination site $T_1$, and the actual weight of the excavated material that was loaded onto the transporting asset 140 at the site S of the mass excavation project. Thereby, a more efficient management of the mass excavation project is enabled.

Action 405. Optionally, in some examples, the user device 141 trigger an alert in the user device 141 when the remaining material weight receiving capacity of a load destination site $T_1$ associated with an obtained the load receipt falls below a preconfigured threshold level. This means, for example, that the user device 141 may notify or indicate to the driver 142 of the transporting asset 140 carrying excavated material that its selected load destination site $T_1$ may, for example, be about to close or have already exceeded its maximum capacity for the current work shift. This means that the load destination site $T_1$ may not be available for the transporting asset 140 to make its deposit and that the transporting asset 140 should proceed to another destination site, e.g. the load destination site $T_2$, for depositing its loaded excavated material.

Figure 5:
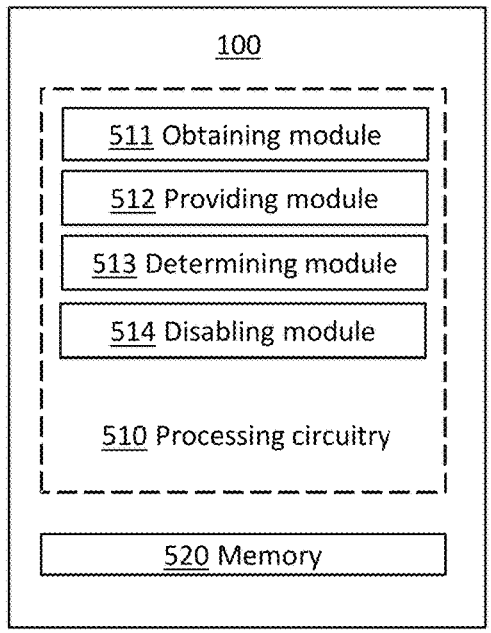
FIG. 5 is a schematic block diagram depicting examples of a network system.

To perform the method actions in a network system 100 for enabling management of a mass excavation project, wherein the mass excavation project is associated with one or more transporting assets 140, 150, 160 and one or more load destination sites $T_1$, $T_2$, wherein each load destination site $T_1$, $T_2$ is associated with a maximum material weight receiving capacity, the network system 100 may comprise the following arrangement depicted in FIG. 5. FIG. 5 shows a schematic block diagram of examples of a network system 100. The examples of the network system 100 described herein may be considered as independent examples, or may be considered in any combination with each other to describe non-limiting examples. It should also be noted that, although not shown in FIG. 5, it should be noted that known conventional features of a network system 100, such as, for example, a connection to the mains, may be assumed to be comprised in the network system 100 but is not shown or described any further in regards to FIG. 5.

The network system 100 may comprise one or more centrally located or distributed network unit(s), wherein the network system 100 and the one or more network unit(s) may comprise a processing circuitry 510 and a memory 520. It should also be noted that some or all of the functionality described in the examples above as being performed by the first node 110 may be provided by the processing circuitry 510 executing instructions stored on a computer-readable medium, such as, the memory 520 shown in FIG. 5. The processing circuitry 510 may also comprise an obtaining module 511, a providing module 512, a determining module 513, and a disabling module 514, each responsible for providing its functionality to support the examples described herein.

The network system 100 or processing circuitry 510 is configured to, or may comprise the obtaining module 511 configured to, obtain, from a user device 141 associated with a transporting asset 140, a first information indicating that the transporting asset 140 has been loaded with excavated material. Also, the network system 100 or processing circuitry 510 is configured to, or may comprise the providing module 512 configured to, provide, to the user device 141 associated with the transporting asset 140, a load receipt based on the obtained first information, whereby the load receipt is associated with a load destination site $T_1$ for depositing the excavated material. Further, the network system 100 or processing circuitry 510 is configured to, or may comprise the obtaining module 511 configured to, obtain, from the user device 141 associated with the transporting asset (140), a second information indicating that the transporting asset 140 has off-loaded the excavated material at the load destination site $T_1$ and the weight of the excavated material. Furthermore, the network system 100 or processing circuitry 510 is configured to, or may comprise the determining module 512 configured to, determine a remaining material weight receiving capacity of the load destination site $T_1$ based on the obtained weight of the excavated material and the maximum material weight receiving capacity of the load destination site $T_1$.

In some examples, the network system 100 or processing circuitry 510 may be configured to, or may comprise the providing module 512 configured to, provide, to user devices associated with the one or more transporting assets 140, 150, 160 and/or user devices associated with the mass excavation project, information indicating the determined remaining material weight receiving capacity of the load destination site $T_1$. In some examples, the network system 100 or processing circuitry 510 may be configured to, or may comprise the disabling module 514 configured to, disable associations of load receipts to a load destination site $T_1$ when the remaining material weight receiving capacity of the load destination site $T_1$ falls below a predetermined threshold level. According to some examples, the network system 100 or processing circuitry 510 may be configured to, or may comprise the providing module 512 configured to, provide, to the user device 141 associated with the transporting asset 140, a delivery receipt based on the obtained second information. In some examples, the obtained weight of the excavated material is a crowned or verified weight obtained at the load destination site $T_1$ by the user device 141 associated with the transporting asset 140.

Furthermore, the examples for enabling management of a mass excavation project described above may be implemented through one or more processors, such as the processing circuitry 510 in the network system 100 depicted in FIG. 5, together with computer program code for performing the functions and actions of the examples herein. The program code mentioned above may also be provided as a computer program product, for instance in the form of a data carrier carrying computer program code or code means for performing the examples herein when being loaded into the processing circuitry 510 in the network system 100. The computer program code may e.g. be provided as pure program code in the network system 100 or on a server and downloaded to the network system 100. Thus, it should be noted that the modules of the network system 100 may in some examples be implemented as computer programs stored in memory, e.g. in the memory modules 520 in FIG. 5, for execution by processors or processing modules, e.g. the processing circuitry 510 of FIG. 5. Those skilled in the art will also appreciate that the processing circuitry 510 and the memory 620 described above may refer to a combination of analog and digital circuits, and/or one or more processors configured with software and/or firmware, e.g. stored in a memory, that when executed by the one or more processors such as the processing circuitry 610 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
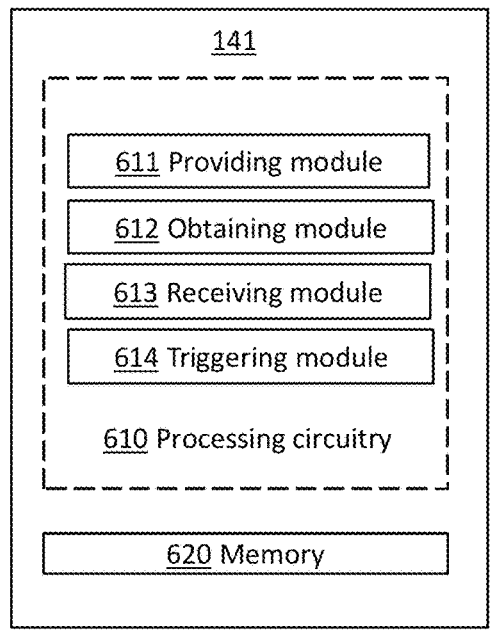
FIG. 6 is a schematic block diagram depicting examples of a user device.

To perform the method actions in a user device 141 associated with a transporting asset 140 for enabling management of a mass excavation project, the user device 141 may comprise the following arrangement depicted in FIG. 6. FIG. 6 shows a schematic block diagram of examples of a user device 141. The examples of the user device 141 described herein may be considered as independent examples, or may be considered in any combination with each other to describe non-limiting examples. It should also be noted that, although not shown in FIG. 6, it should be noted that known optional features of a user device 141, such as, for example, at least one antenna and a power source, e.g. a battery or main connection, may be assumed to be comprised in the user device 141 in some examples, but is not shown or described any further in regards to FIG. 6.

The user device 141 may comprise processing circuitry 610 and a memory 620. It should also be noted that some or all of the functionality described in the examples above as being performed by the user device 141 may be provided by the processing circuitry 610 executing instructions stored on a computer-readable medium, such as, the memory 620 shown in FIG. 6. The processing circuitry 610 may also comprise Alternative examples of the user device 141 may comprise a providing module 611, a obtaining module 612, an receiving module 613, and a triggering module 614, each responsible for providing its functionality to support the examples described herein.

The user device 141 or processing circuitry 610 is configured to, or may comprise the providing module 611 configured to, provide, to a network system 100, a first information indicating that the transporting asset 140 has been loaded with excavated material. Also, the user device 141 or processing circuitry 610 is configured to, or may comprise the obtaining module 612 configured to, obtain, from the network system 100, a load receipt based on the provided first information, whereby the load receipt is associated with a load destination site $T_1$ for depositing the excavated material. Further, the user device 141 or processing circuitry 610 is configured to, or may comprise the receiving module 613 configured to, receive at the load destination site $T_1$ associated with the load receipt, information indicating the weight of the excavated material. Furthermore, the user device 141 or processing circuitry 610 is configured to, or may comprise the providing module 613 configured to, provide, to the network system 100, a second information indicating that the transporting asset 140 has off-loaded the excavated material at the load destination site $T_1$ and the received weight of the excavated material.

In some examples, the user device 141 or processing circuitry 610 may be configured to, or may comprise the triggering module 611 configured to, trigger an alert in the user device 141 when the remaining material weight receiving capacity of a load destination site $T_1$ associated with an obtained the load receipt falls below a preconfigured threshold level.

Furthermore, the examples for enabling management of a mass excavation project described above may be implemented through one or more processors, such as the processing circuitry 610 in the user device 141 depicted in FIG. 6, together with computer program code for performing the functions and actions of the examples herein. The program code mentioned above may also be provided as a computer program product, for instance in the form of a data carrier carrying computer program code or code means for performing the examples herein when being loaded into the processing circuitry 610 in the user device 141. The computer program code may e.g. be provided as pure program code in the user device 141 or on a server and downloaded to the user device 141. Thus, it should be noted that the modules of the user device 141 may in some examples be implemented as computer programs stored in memory, e.g. in the memory modules 620 in FIG. 6, for execution by processors or processing modules, e.g. the processing circuitry 610 of FIG. 6. Those skilled in the art will also appreciate that the processing circuitry 610 and the memory 620 described above may refer to a combination of analog and digital circuits, and/or one or more processors configured with software and/or firmware, e.g. stored in a memory, that when executed by the one or more processors such as the processing circuitry 610 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 7:
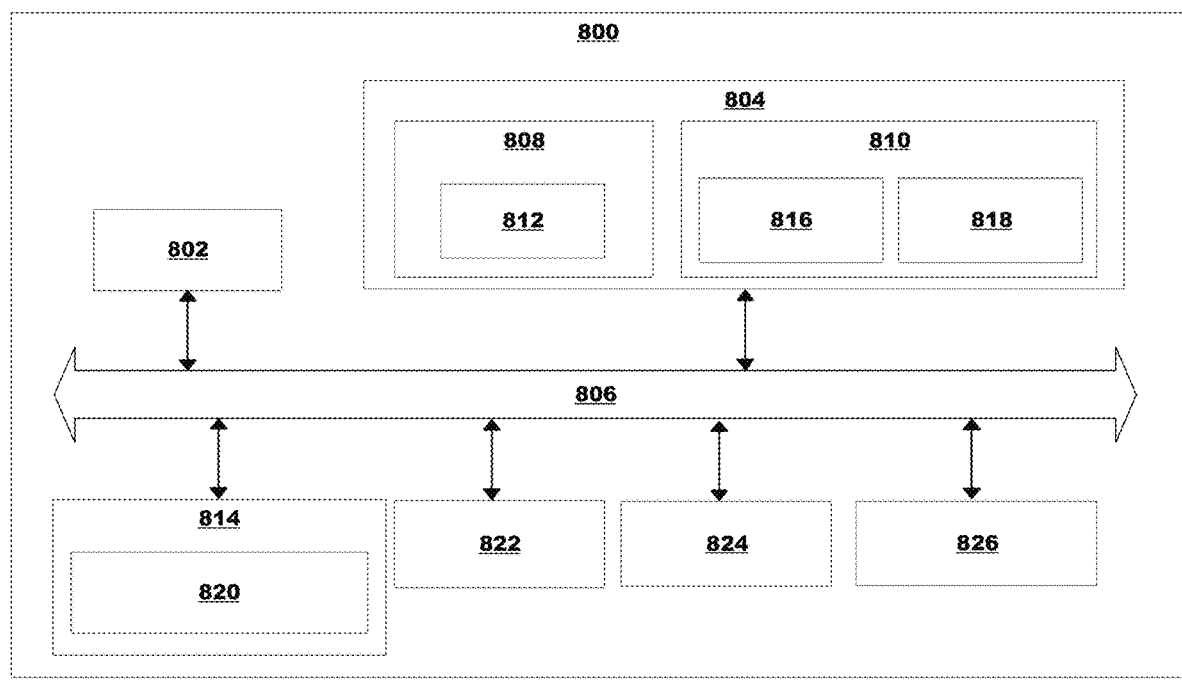
FIG. 7 is a schematic diagram of an exemplary computer system for implementing examples disclosed herein according to some examples.

FIG. 7 is a schematic diagram of a computer system 800 for implementing examples disclosed herein. The computer system 800 is adapted to execute instructions from a computer-readable medium to perform these and/or any of the functions or processing described herein. The computer system 800 may be connected (e.g., networked) to other machines in a LAN, an intranet, an extranet, or the Internet. While only a single device is illustrated, the computer system 800 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 800 may comprise at least one computing device or electronic device capable of including firmware, hardware, and/or executing software instructions to implement the functionality described herein. The computer system 800 may include a processor device 802 (may also be referred to as a control unit), a memory 804, and a system bus 806. The computer system 800 may include at least one computing device having the processor device 802. The system bus 806 provides an interface for system components including, but not limited to, the memory 804 and the processor device 802. The processor device 802 may include any number of hardware components for conducting data or signal processing or for executing computer code stored in memory 804. The processor device 802 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 806 may be any of several types of bus structures that may further interconnect to a memory bus (with or without a memory controller), a peripheral bus, and/or a local bus using any of a variety of bus architectures. The memory 804 may be one or more devices for storing data and/or computer code for completing or facilitating methods described herein. The memory 804 may include database components, object code components, script components, or other types of information structure for supporting the various activities herein. Any distributed or local memory device may be utilized with the systems and methods of this description. The memory 804 may be communicably connected to the processor device 802 (e.g., via a circuit or any other wired, wireless, or network connection) and may include computer code for executing one or more processes described herein. The memory 804 may include non-volatile memory 808 (e.g., read-only memory (ROM), erasable programmable read-only memory (EPROM), electrically erasable programmable read-only memory (EEPROM), etc.), and volatile memory 810 (e.g., random-access memory (RAM)), or any other medium which can be used to carry or store desired program code in the form of machine-executable instructions or data structures and which can be accessed by a computer or other machine with a processor device 802. A basic input/output system (BIOS) 812 may be stored in the non-volatile memory 808 and can include the basic routines that help to transfer information between elements within the computer system 800.

The computer system 800 may further include or be coupled to a non-transitory computer-readable storage medium such as the storage device 814, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 814 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 514 and/or in the volatile memory 810, which may include an operating system 516 and/or one or more program modules 818. All or a portion of the examples disclosed herein may be implemented as a computer program product 520 stored on a transitory or non-transitory computer-usable or computer-readable storage medium (e.g., single medium or multiple media), such as the storage device 814, which includes complex programming instructions (e.g., complex computer-readable program code) to cause the processor device 802 to carry out the steps described herein. Thus, the computer-readable program code can comprise software instructions for implementing the functionality of the examples described herein when executed by the processor device 802. The processor device 802 may serve as a controller or control system for the computer system 800 that is to implement the functionality described herein.

The computer system 800 also may include an input device interface 822 (e.g., input device interface and/or output device interface). The input device interface 822 may be configured to receive input and selections to be communicated to the computer system 800 when executing instructions, such as from a keyboard, mouse, touch-sensitive surface, etc. Such input devices may be connected to the processor device 802 through the input device interface 522 coupled to the system bus 806 but can be connected through other interfaces such as a parallel port, an Institute of Electrical and Electronic Engineers (IEEE) 1394 serial port, a Universal Serial Bus (USB) port, an IR interface, and the like. The computer system 800 may include an output device interface 824 configured to forward output, such as to a display, a video display unit (e.g., a liquid crystal display (LCD) or a cathode ray tube (CRT)). The computer system 800 may also include a communications interface 826 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

According to some additional examples, a control system comprising one or more control units configured to perform the method according to any of the examples described above is also provided.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A method, comprising:
   obtaining, at a network system from a user device associated with a transporting asset, a first information indicating that the transporting asset has been loaded with excavated material, the network system enabling management of a mass excavation project, wherein the mass excavation project is associated with one or more transporting assets and one or more load destination sites, wherein each load destination site is associated with a maximum material weight receiving capacity;
   providing, from the network system to the user device associated with the transporting asset, a load receipt based on the obtained first information, whereby the load receipt is associated with a load destination site for depositing the excavated material;
   obtaining, at the network system from the user device associated with the transporting asset, a second information indicating that the transporting asset has off-loaded the excavated material at the load destination site and the weight of the excavated material;
   determining by the network system a remaining material weight receiving capacity of the load destination site based on the obtained weight of the excavated material and the maximum material weight receiving capacity of the load destination site;
   disabling, by the network system, associations of load receipts to a load destination site when the remaining material weight receiving capacity of the load destination site falls below a predetermined threshold level, whereby a transporting asset is no longer directed towards said load destination site and instead the transporting asset proceeds to another destination site for depositing its loaded excavated material.

2. The method according to claim 1, further comprising providing, to user devices associated with the one or more transporting assets and/or user devices associated with the mass excavation project, information indicating the determined remaining material weight receiving capacity of the load destination site.

3. The method according to claim 1, further comprising providing, to the user device associated with the transporting asset, a delivery receipt based on the obtained second information.

4. The user device according to claim 1, wherein the obtained weight of the excavated material is a crowned or verified weight obtained at the load destination site by the user device associated with the transporting asset.

5. A network system for enabling management of a mass excavation project, wherein the mass excavation project is associated with one or more transporting assets and one or more load destination sites, wherein each load destination site is associated with a maximum material weight receiving capacity, the network system comprising a processing circuitry and a memory, the processing circuitry being configured to:
   obtain, from a user device associated with a transporting asset, a first information indicating that the transporting asset has been loaded with excavated material,
   provide, to the user device associated with the transporting asset, a load receipt based on the obtained first information, whereby the load receipt is associated with a load destination site for depositing the excavated material,
   obtain, from the user device associated with the transporting asset, a second information indicating that the transporting asset has off-loaded the excavated material at the load destination site and the weight of the excavated material,
   determine a remaining material weight receiving capacity of the load destination site based on the obtained weight of the excavated material and the maximum material weight receiving capacity of the load destination site; and
   disabling, by the network system, associations of load receipts to a load destination site when the remaining material weight receiving capacity of the load destination site falls below a predetermined threshold level, whereby a transporting asset is no longer directed towards said load destination site and instead the transporting asset proceeds to another destination site for depositing its loaded excavated material.

6. The network system according to claim 5, wherein the processing circuitry is further configured to provide, to user devices associated with the one or more transporting assets and/or user devices associated with the mass excavation project, information indicating the determined remaining material weight receiving capacity of the load destination site.

7. The network system according to claim 5, wherein the processing circuitry is further configured to provide, to the user device associated with the transporting asset, a delivery receipt based on the obtained second information.

8. The network system according to claim 5, wherein the obtained weight of the excavated material is a crowned or verified weight obtained at the load destination site by the user device associated with the transporting asset.

9. A method for enabling management of a mass excavation project, the method comprising:
by a user device associated with a transporting asset, providing, to a network system, a first information indicating that the transporting asset has been loaded with excavated material;
by the user device, obtaining, from the network system, a load receipt based on the provided first information, whereby the load receipt is associated with a load destination site for depositing the excavated material;
by the user device, receiving, at the load destination site associated with the load receipt, information indicating the weight of the excavated material; and
by the user device, providing, to the network system, a second information indicating that the transporting asset has off-loaded the excavated material at the load destination site and the received weight of the excavated material; and
triggering, by the user device, an alert in the user device when the remaining material weight receiving capacity of a load destination site associated with an obtained the load receipt falls below a preconfigured threshold level, whereby the transporting asset proceeds to another destination site for depositing its loaded excavated material.

10. A user device associated with a transporting asset for enabling management of a mass excavation project, wherein the user device comprising a processing circuitry and a memory, the processing circuitry being configured to:
provide, to a network system, a first information indicating that the transporting asset has been loaded with excavated material,
obtain, from the network system, a load receipt based on the provided first information, whereby the load receipt is associated with a load destination site for depositing the excavated material,
receive, at the load destination site associated with the load receipt, information indicating the weight of the excavated material,
provide, to the network system, a second information indicating that the transporting asset has off-loaded the excavated material at the load destination site and the received weight of the excavated material, and
trigger an alert in the user device when the remaining material weight receiving capacity of a load destination site associated with an obtained the load receipt falls below a preconfigured threshold level, whereby the transporting asset proceeds to another destination site for depositing its loaded excavated material.

11. A vehicle comprising a user device according to claim 10.

12. A non-transitory computer-readable storage medium comprising instructions, which when executed on a processing circuitry of a network system or on a processing circuitry of a user device, cause the processing circuitry to perform the method of claim 1.

* * * * *